(12) United States Patent
Bellovin et al.

(10) Patent No.: US 7,558,970 B2
(45) Date of Patent: Jul. 7, 2009

(54) PRIVACY-ENHANCED SEARCHES USING ENCRYPTION

(75) Inventors: Steven Michael Bellovin, Westfield, NJ (US); William Roberts Cheswick, Bernardsville, NJ (US)

(73) Assignee: AT&T Corp., New York, NY (US)

( * ) Notice: Subject to any disclaimer, the term of this patent is extended or adjusted under 35 U.S.C. 154(b) by 789 days.

(21) Appl. No.: 11/031,389

(22) Filed: Jan. 8, 2005

(65) Prior Publication Data

US 2005/0166046 A1     Jul. 28, 2005

Related U.S. Application Data

(60) Provisional application No. 60/538,517, filed on Jan. 23, 2004.

(51) Int. Cl.
*H04L 9/18*     (2006.01)
(52) U.S. Cl. ..................................... 713/193
(58) Field of Classification Search ............... 713/171, 713/165–167, 193; 380/44, 47, 228, 286
See application file for complete search history.

(56) References Cited

OTHER PUBLICATIONS

Boyens C, Günther O (2003) Using online services in untrusted environments: a privacy-preserving architecture. In Proceedings of the Eleventh European Conference on Information Systems (Ciborra CU, Mercurio R, de Marco M, Martinez M, Carignani A eds.), 239-250, Naples, Italy.*

* cited by examiner

*Primary Examiner*—Gilberto Barron. Jr.
*Assistant Examiner*—Venkat Perungavoor
(74) *Attorney, Agent, or Firm*—Henry Brendzel

(57) ABSTRACT

Encryption with keys that form an Abelian group are used in combination with a semi-trusted party that converts queries that are encrypted with the key of a querier to queries that are encrypted with the key of the encrypted database, without knowing the actual keys. In an illustrative embodiment, encryption is done with Bloom filters that employ Pohlig-Hellman encryption. Since the querier's key is not divulged, neither the semi-trusted party nor the publisher of the database can see the original queries. Provision can be made for fourth party "warrant servers", as well as "censorship sets" that limit the data to be shared.

30 Claims, 3 Drawing Sheets

| WORD | BLOOM SIGNATURE |
|---|---|
| POLONIUM | 0,1,2,10,13,47 |
| ORALLOY | 10,15,16,26,35,43 |
| BERYLLIUM | 4,6,10,18,18,20 |
| NEUTRON | 0,2,11,25,41,43 |
| GOLDSCMIDT | 1,16,19,28,42,44 |
| KISTIAKOWSKY | 4,4,10,14,36,44 |
| MEITNER | 12,13,22,25,27,36 |
| SZILARD | 11,16,33,38,43,43 |

FIG. 3

| SIGNATURE BIT | WORD |
|---|---|
| 0 | POLONIUM, NEUTRON |
| 1 | POLONIUM, GOLDSCHMIDT |
| 2 | POLONIUM, NEUTRON |
| 4 | BERYLLIUM, KISTIAKOWSKY |
| 6 | BERYLLIUM |
| 10 | POLONIUM, ORALLOY, BERYLLIUM, KISTIAKOWSKY |
| 11 | NEUTRON,SZILARD |
| 12 | MEINTNER |
| 13 | POLONIUM,MEITNER |
| 14 | KISTIAKOWSKY |
| 15 | ORALLOY |
| 16 | ORALLOY,GOLDSCHMIDT,SZILARD |
| 18 | BERYLLIUM |
| 19 | GOLDSCHMIDT |
| 20 | BERYLLIUM |
| 22 | MEITNER |
| 25 | NEUTRON,MEITNER |
| 26 | ORALLOY |
| 27 | MEITNER |
| 28 | GOLDSCHMIDT |
| 33 | SZILARD |
| 35 | ORALLOY |
| 36 | KISTIAKOWSKY,MEITNER |
| 38 | SZILARD |
| 41 | NEUTRON |
| 42 | GOLDSCHMIDT |
| 43 | ORALLOY,NEUTRON,SZILARD |
| 44 | GOLDSCHMIDT,KISTIAKOWSKY |
| 47 | POLONIUM |

US 7,558,970 B2

PRIVACY-ENHANCED SEARCHES USING ENCRYPTION

RELATED APPLICATIONS

This application relates to, and claims priority from Provisional Application No. 60/538,517, filed Jan. 23, 2004.

BACKGROUND

This application relates to database queries and, more particularly, to database queries that are encrypted to prevent the owner of a queried database from knowing the substance of the queries presented to the database.

It is often necessary for two or more or more parties that do not fully trust each other to selectively share data. For example, intelligence agency A may wish to let intelligence agency B to query a database of intelligence agency A, but only to the extent of only disclosing clearly relevant documents to intelligence agency B. Conversely, intelligence agency B is willing to search the database of intelligence agency A, but only if such a search does not reveal precisely what the subject of the search is.

Conventional search techniques do not permit this. Although a publication by Eu-Jin Goh, "Secure indexes for efficient searching on encrypted compressed data," Cryptology ePrint Archive, Report 2003/216, 2003, http://eprint.iacr.org/2003/216/, describes an arrangement that employs Bloom filters, with encryption used for the hash functions, the described arrangement requires that all parties share all keys, which does not meet the goal of keeping the nature of the database search secret.

SUMMARY OF THE INVENTION

An advance in the art is realized by using encryption with keys that form an Abelian group, and a semi-trusted party that converts queries that are encrypted with the key of a querier to queries that are encrypted with the key of the encrypted database, without knowing the actual keys. In an illustrative embodiment, encryption is done with Bloom filters that employ Pohlig-Hellman encryption. Since the querier's key is not divulged, neither the semi-trusted party nor the publisher of the database can see the original queries. Provision can be made for fourth party "warrant servers", as well as "censorship sets" that limit the data to be shared.

BRIEF DESCRIPTION OF THE DRAWINGS

FIG. 3 presents a small database corresponding to the FIG. 2 Bloom filter signatures; and.

DETAILED DESCRIPTION

Figures 1, 2:
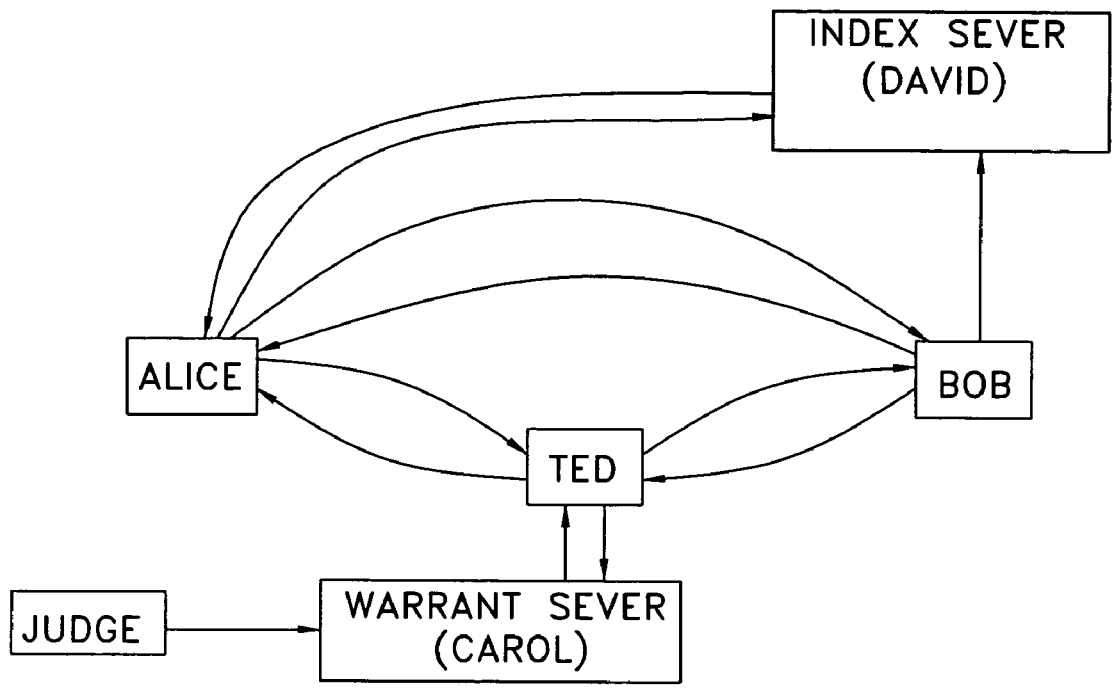
FIG. 1 depicts an arrangement in accord with the principles of this invention.
FIG. 2 presents an illustrative set of Bloom filter signatures of various words, where m=64.

FIG. 1 shows an arrangement where Bob is a database publisher. Although Bob is willing to entertain queries of his database, he is not willing to expose the database itself and, therefore, Bob encrypts the index to his database (by the use of hash or encryption functions). Alice may wish to query Bob's index but she does not have a key to decrypt Bob's index, nor does she have the key by which Bob's index was encrypted. Alice could send the query to Bob in plaintext, and Bob can encrypt the query and thus search his encrypted index, but Alice does not want Bob to know what she is searching for. To solve this problem a party that is trusted by both parties, Ted, can be engaged, with Alice encrypting her query with one key, sending the encrypted query to Ted, Ted decrypts Alice's query, re-encrypts it with Bob's key and forwards the query to Bob. Bob executes the query, and returns the answer to Alice (either directly or through Ted).

The issue with this approach is that Ted has to be trusted by both Alice and Bob.

In accord with one aspect of the principles disclosed herein, Ted can be only a semi-trusted party, and be given some information relating to the keys, but not the keys themselves, and the search can still be executed. This is achieved by selecting Alice's key and Bob's key such that they belong to an Abelian group, allowing Ted to transform Alice's query that is encrypted with Alice's key, $k_A$, to a query that is encrypted with Bob's key, $k_B$, without knowing the keys $k_A$ and $k_B$. An Abelian group is one whose members commute (i.e., ab=ba for all elements a and b that are members of the group). Expressing the encryption schema disclosed herein more formally, a cipher is employed such that for all input values to be encrypted, W, the set of all keys k (each key $k_i$ effectively defining a different hash function $H_i$) forms a closed group under the operation composition of encryption of W. That is, $$\{\{X\}_k\}_j = \{X\}_{j \circ k}$$

for all j and k, and some operator "∘" Thus, in accord with the principles disclosed herein, when Alice wishes to query Bob's database for some entry W, she calculates $V_{W_A} = \{W\}_{k_A}$ using her key $k_A$, and sends $V_{W_A}$ to Ted. Ted does not know any keys, but for each pair i and j, Ted has information (described below) that allows Ted to compute the ratio key $r_{i,j} = k_j \circ k_i^{-1}$. Ted employs the ratio key $r_{A,B}$ to transform the first encrypted query, $V_{W_A}$, into a second encrypted query, $V_{W_B}$, by $\{W\}_{k_B} = \{V_{W_A}\}_{r_{A,B}}$, and to, for example, return it to Alice. Alice then sends the encrypted query to Bob, and receives an answer. The consequence of this approach is that Alice can query Bob's database without disclosing the query, without knowing Bob's key, and without needing to have complete trust in Ted. It may be noted in passing that precisely for the reason that Abelian group keys are useful in the FIG. 1 arrangement, such keys are strongly disfavored in the context of encryption.

Different encryption schemas can be employed in the FIG. 1 arrangement. One schema that constitutes a very efficient way to store information about the existence of a record in a database employs the notion of Bloom filters, which is described, for example, in B. H. Bloom, "Space/Time trade-offs in hash coding with allowable errors," Communications of ACM, vol. 13, no. 7, pp. 422-426, July 1070.

A Bloom filter is an array B of m bits and n words, corresponding to n independent hash functions $H_i$, each of which produces a uniformly distributed output in the range [0, m−1] over all possible inputs. The output of the filter is a signature, which may be represented by a string of m bits, where the string has at most n 1's. To create a signature in response to an applied entry (for examples, a word), the filter calculates $$b_1 = H_1(W)$$
$$b_2 = H_2(W)$$
$$\vdots$$
$$b_n = H_n(W)$$

and then sets bits in string B at the positions specified by $b_i$; i.e., $\forall i, 1 \leq i \leq n$, set $B[b_i]=1$. To illustrate, if n=5, m=16, an entry $W_x$ (e.g., the string "patent") that is hashed with particular functions $H_1$ through $H_5$ might yield the values 1, 4, 5, 14 and 5 for $b_1$ through $b_5$, respectively, and setting bits 1, 4, 5, and 14 to 1 results in the 16 bit string that forms the Bloom filter output (signature) being 0100110000000010. Expressed in other words, it may be said that the Bloom filter signature of the string "patent" is represented by the set {1, 4, 5, 14}. Another string might, for example, yield the values 3, 1, 3, 1 for functions hash function $H_1$ through $H_5$, respectively, in which case the Bloom filter signature of the string is represented by the set {1,3}.

Of course, signatures of other words can be subsumed in the {1, 4, 5, 14} and, therefore, one cannot tell what string yielded the signature. Also, when a database of signatures is queried and the query results in a hit, the most that can be said is that, with some level of likelihood, the searched-for string is present in the database. There may be false positives, however, but the likelihood of false positive depends on the value of m and n and, therefore, those values should be chosen appropriately.

It is noted that the hash functions employed in the above-described Bloom filter can actually be encryption functions $H_i(W)=\{W\}_{k_i}$ or $H_i(W)=\{W\|i\}_k$, where $W\|i$ is $W$ concatenated with i. That is, instead of using n hash functions, one can use n encryption functions since encryption functions typically produce uniformly distributed pseudo-random output. The outputs of the encryption functions are, as before, transformed into Bloom filter signatures.

In order to avoid the need to distribute the keys, this disclosure employs a cipher that forms an Abelian group over its keys, so that $$\{\{X\}_k\}_j = \{X\}_{j \circ k}$$

for all keys j and k and some operator $\circ$. Such ciphers are not common and, as indicated above, are quite disfavored in the encryption arts.

S. C. Pohling et al, "An improved algorithm for computing logarithms over GF(p) and its cryptographic significance," IEEE Transactions on Information theory, vol. IT-24, pp. 106-110, 1978, (see also U.S. Pat. No. 4,424,414) describe an interesting encryption scheme. In the Pohlig-Hellman (PH) scheme a message is encrypted under key k by raising the message to the $k^{th}$ power modulo some large prime number p; i.e., $\{X\}_k = X^k \mod p$ with key k being relatively prime to p. These requirements can be met by choosing p to be a prime of the form $2p'+1$ where p' is also prime, and mandating that all keys be odd and not equal to p. Choosing the keys to be less than p insures that they are relatively prime to p; and since $x^{p-1}=1 \mod p$, the keys are restricted further to be less than p−1, and from elementary number theory we know that we must do all exponent arithmetic modulo p−1. The decryption key d is chosen such that $kd \equiv 1 \mod(p-1)$, and thus d can be calculated efficiently by Euclid's Algorithm.

It can be shown that PH encryption is an Abelian group. To illustrate, suppose that we have $\{X\}_k$ and wish to produce $\{X\}_j$. Letting $r = j \cdot k^{-1} \mod(p-1)$, where $k^{-1}$ is the decryption key corresponding to k, i.e., the multiplicative inverse of k $\mod(p-1)$, where $k^{-1}$ is the decryption key corresponding to k, we get:

$$\{\{X\}_k\}_r = (X^k)^r \mod(p-1)$$
$$= X^{kr} \mod(p-1)$$
$$= X^{k \cdot j \cdot k^{-1}} \mod(p-1)$$
$$= X^{k k^{-1} j} \mod(p-1)$$
$$= X^j \mod(p-1)$$
$$= \{X\}_j.$$

Thus, PH encryption can be used as the mechanism for obtaining the set of hash values that are then used to create the Bloom filter signature for this invention. That is, given a desired search string, W, Alice can raise W to n different powers k, $$b_1 = \{W\}_{k1}$$
$$b_2 = \{W\}_{k2}$$
$$\vdots$$
$$b_n = \{W\}_{kn}$$

create the Bloom filter signature from the values $b_1, b_2, \ldots b_n$, send the signature to Ted, and have Ted transform it to a signature based on Bob's set of encryption functions; i.e., $$b'_1 = \{\{W\}_{k1}\}_{r1} = \{W\}_{j1}$$
$$b'_2 = \{\{W\}_{k2}\}_{r2} = \{W\}_{j1}$$
$$\vdots$$
$$b'_n = \{\{W\}_{kn}\}_{rn} = \{W\}_{j1}.$$

Alas, PH encryption requires exponentiation modulo a large prime p (for sake of security, p might be at least 1024 bits long), and performing exponentiation n times represents a heavy computational burden. However, such encryption naturally produces a large output value, and that value can be viewed as having generated an entire family of hash values, or encryption results, by simply selecting different segments of the binary representation of the encryption results. To illustrate, if a PH encryption of a string yields a string of 1024 bits, one can select therefrom 20 sub-strings to represent the set of Bloom filter values that form a signature. Employed in this manner, PH encryption becomes an efficient means for Bloom filter applications.

The set of hash values bi resulting from PH encryption can be represented in two different ways: as the result of the Pohlig-Hellman encryption, in which case it is a single large number, or as a set of Bloom Filter indices. Both forms can be used, but they are not equivalent. For one, when the PH result is viewed as a single large number, it is simply the encryption of a term, and when Ted converts the encryption result that Alice provides to a result that was effectively encrypted with Bob's key, Bob can decrypt the result and thus know precisely the term in Alice's query. This can be prevented by Alice first calculating W'=G(W) where G is a cryptographic hash function, prior to performing the PH encryption. Of course, Bob must employ the same G hash function in the creation of Bob's database, in which case the hashed term is the effective search term for the database and for all queries.

Thus, Alice PH encrypts the search term, sends the result to Ted, Ted converts it to an encryption with Bob's key to crate W, and hashes it with G to crate W'. Ted can then send the result as a single large number to Bob's database, or can create the Bloom filter signature, and send that to Bob's database.

One problem is that still exists is that Alice's query is exposed to a dictionary attack. An improvement to the security of Alice's query is obtained by truncating the query, thereby expanding the number of responsive documents, and consequently increasing the doubt as to what Alice was looking for. The truncating can be performed by Alice, or by Ted. Alternatively, or in addition, Alice can include dummy words, which further increases the ambiguity as to what Alice was looking for.

In accordance with the above, Alice sends Ted an encrypted query, in PH form (i.e., the string that can be thought of as representing one large number). Ted performs the transformation of the received string to Bob's key, and converts the transformed value to set form. This set is modified by deleting some entries, leaving $n'<n$ valid ones, and adding some random values (to the set).

To illustrate, consider the sample Bloom signatures shown the FIG. 2 table, and consider further a query for "polonium", whose Bloom signature is 0, 1, 2, 10, 13, 47. A query on all six members of the query set $\{0, 1, 2, 10, 13, 47\}$ would yield documents that contain "polonium," if they exist, and perhaps other documents that contain a word that has the same signature. If, however, a query is made to identify documents that match on four of the six members of the set, for example, $\{2, 10, 13, 47\}$, then documents that contain "polonium" will be identified, but probably also many more (than before) other documents will be identified because they contain words that match the four bits of the query. Looking at the FIG. 3 table with the set $\{0, 1, 2, 10, 13, 47\}$ yields the following:

| signature member | word |
| --- | --- |
| 0 | polonium, neutron |
| 1 | polonium, Goldschmidt |
| 2 | polonium, neutron |
| 10 | polonium, oralloy, beryllium, Kistiakowsky |
| 13 | polonium, Meitner |
| 47 | polonium. |

Aside form the fact that "polonium" has 6 hits, which means that a document definitely exist with the signature $\{0, 1, 2, 10, 13, 47\}$, it can also be observed that "neutron" has only 2 hits, and all other terms have one hit each. As far as Bob is concerned, there is very little doubt as to which term Alice is interested in. On the other hand, with a query set of $\{2, 10, 13, 47\}$, which is a subset of the full signature, the query yields

| signature member | word |
| --- | --- |
| 2 | polonium, neutron |
| 10 | polonium, oralloy, beryllium, Kistiakowsky |
| 13 | polonium, Meitner |
| 47 | polonium. |

Aside from the fact that "polonium" has only four hits and therefore it is not clear as to whether a document exists with an encrypted term with the signature $\{0, 1, 2, 10, 13, 47\}$, it is noted that the other terms still have one hit, and now the difference (between 1 hit and 6 hits, on one hand, and 1 hit and 4 hits, on the other hand) offers less confidence to Bob as to what the query is seeking. As an aside, it is appreciated that while deleting some valid terms from Alice's query set will increase the false positive rate that Alice gets, if n is large enough, the effect of such deletions can be made small enough to be tolerated.

Expanding the query by including in the query set with some random entries, for example $\{8, 12, 16, 43\}$ to form the query set $\{2, 8, 10, 12, 13, 16, 43, 47\}$, the query yields

| signature member | word |
| --- | --- |
| 2 | polonium, neutron |
| 8 | - (no responsive document found) |
| 10 | polonium, oralloy, beryllium, Kistiakowsky |
| 12 | Meitner |
| 13 | polonium, Meitner |
| 16 | oralloy, Goldschmidt, Szilard |
| 43 | oralloy, neutron, Szilard |
| 47 | polonium |

Now, "polonium" has 4 hits, "oralloy" has 3 hits, "Meitner,", "Szilard" and "neutron" have 2 hits each, and "Kistiakowsky" and "Goldschmidt" have 1 hit each. Clearly, the confidence that Bob might have that "polonium" is the term of interest to Alice would be significantly weaker than before.

Still, there is some information leakage. A successful query will match n' of the n bits belonging to the target word, and if Bob has an inverted index of the Bloom filter he can see what the query word is, because it will be the only one with an n' hit count. Alice's defense is to ensure that some other word or words (retrieved in response to the n' bits and the added random values) have similarly high hit counts. This may be achieved by salting the query to search for more than one word (e.g. "neutron" OR "satellite") where the added words are likely to be in Bob's database but which Alice has no interest in. The danger would be in correlations unknown to Alice. That is, the dummy words she may select might be found in the same documents as the words of interest. Furthermore, over a series of several searches, the dummy words may very well fit some recognizable pattern. For example, given two query sets of "miniskirt OR poodle OR uranium OR houndfish," and "plutonium OR privacy OR cotton OR snake" it would be pretty clear what the topic of interest was.

Under certain circumstances, it may be desirable to restrict the scope of some queries. For example, a police officer pursuing an investigation by searching though documents of a suspect's computer may be restricted (by court order) to query only on terms listed in a warrant. Similarly, document discovery in a civil suit may be limited by court order to certain subjects. This can be accomplished with a warrant server, as shown in FIG. 1.

Warrant server Carol has authoritative knowledge of entries (e.g., words) that Alice is not permitted to search for. Carol gets this knowledge from Judge, shown in FIG. 1, who (a) is provided with Carol's encryption key (from the same Abelian group to which Alice's and Bob's keys belong), (b) knows the impermissible terms, (c) encrypts those terms with Carol's encryption key, and (d) forwards the encrypted terms to Carol. All this is done beforehand. When Ted receives a search query from Alice, he transforms the query to Carol's key and forwards it to Carol. Carol deletes from the query all impermissible terms and sends the result back to Ted, for transformation from Carol's key to Bob's key. To illustrate (ignoring the encryptions), assume, for example, that the term "polonium" was an impermissible search term, and that Alice wishes to query for "polonium OR beryllium;" (signature: 0, 1, 2, 10, 13, 47) or (signature: 4, 6, 10, 18, 18, 20). Assume further that Alice attempts to obscure her search by selecting only 4 elements from each set, for example, 1, 2, 13, and 17 from the first set, and 4, 6, 18, and 20 from the second set. Carol is charged with disallowing searches by Alice on "polonium." That is translated to disallowing any query set that comprises elements 0, 1, 2, 10, 13, 47, and any subset of these elements. That means that any submitted query set that does not include a term from outside the set {0, 1, 2, 10, 13, 47} is deleted from the query. Consequently, when Carol receives {1, 2, 13, 17} OR {4, 6, 18, 20} she deletes {1, 2, 13, 17} and returns only {4, 6, 18, 20} to Ted. Ted then salts the query, for example, by adding the random query set {3, 12, 25, 33}, and forwards the query (appropriately encrypted) to Bob.

Under certain circumstances it might be also desirable to allow Bob a degree of censorship. Bob might be willing to respond to certain requests from Edward (not shown in FIG. 1) but not from Alice. Such control can be effected by Ted, who may be provided by Bob with censorship sets. In such an arrangement, when Ted receives the query redacted by Carol (based on Judge's specification), Ted salts it with the random terms, converts the query set to Bob's key, applies the censorship set for Alice, and forwards the redacted query (as appropriate) to Bob.

It should be noted that both warrant servers and censorship sets are specific to both the source and the destination of the query. That is, Alice may be allowed to ask different questions of Bob than of Frank (not shown in FIG. 1), and similarly, Bob may be willing to disclose different documents to Frank than to Alice.

Another approach to protecting queries is to use index servers (David). Bob sends his encrypted database to David, and each document is tagged with an opaque name. As before, Alice sends her queries to Ted, and Ted transforms them to Bob's key. However, instead of being routed to Bob, the transformed queries are sent to David. David performs the queries and sends back the document names. Alice (or Ted, or David) can then ask Bob for these documents.

The advantage of using an index server is that Bob never sees the queries, and hence cannot perform any sort of guessing attack. The index server doesn't know Bob's key, and hence can't build a dictionary. Dummy queries may still be necessary if Alice wants to prevent Bob from even knowing the topic of the investigation (knowledge gained from the action of asking for specific documents).

Considering now how to provide the necessary r values (such as $r_{AB}$) to Ted, it is noted that the exact mechanisms may vary on the specific encryption algorithm that is employed. The process is quite simple if the keys themselves form a group under multiplication modulo p–1 that is isomorphic to the previously-described encryption group.

To calculate the ratio $r_{BA}$ between two keys $k_A$, $k_B$, where Alice (A) and Bob (B) belong to Q, i.e., A, B∈Q, both A and B set up a secure channel to Ted (T) and between themselves. A and B generate random blinding factors FA, and FB, respectively, and T generates blinding factors $F_{TA}$ and $F_{TB}$, where $1 \leq F_X < p-1$. The following messages are sent (over the pairwise encrypted channels), with all arithmetic being done modulo (p–1).

Message
1 A→T: $k_A \cdot F_A$
2 B→T: $k_B \cdot F_B$
3 T→A: $F_{TA}$
4 T→B: $F_{TB}$
5 A→B: $F_A \cdot F_{TA}$
6 B→A: $F_B \cdot F_{TB}$
7 A→T: $(F_A \cdot F_{TA})/(F_B \cdot F_{TB})$
8 B→T: $(F_B \cdot F_{TB})/(F_A \cdot F_{TA})$.

For simplicity, a/b means $ab^{-1}$, where $b^{-1}$ is the inverse of b in the Abelian group of integers modulo (p–1).

From messages 1 and 2, Ted can calculate $k_A \cdot F_A/k_B \cdot F_B$. Combining that with message 8, Ted can calculate $$\frac{k_A \cdot F_A}{k_B \cdot F_B} \cdot \frac{F_B \cdot F_{TB}}{F_A \cdot F_{TA}} = \frac{k_A}{k_B} \cdot \frac{F_{TB}}{F_{TA}}.$$

However, Ted knows $F_{TA}$ and $F_{TB}$, and can therefore calculate $r_{A,B} = k_A/k_B$. A similar calculation can be done using message 7 to obtain $r_{B,A}$.

If some party G were to collude with Ted, Ted could read queries by transforming them to G's key. To defend against this, a querier Alice can blind messages to Ted by super-encrypting with some nonce key $N_A$, and then decrypting the transformed query. Because PohligHellman encryption and decryption are commutative, the cipher is an Abelian group over the keys, and the message can be successfully unblinded. To see that this is true, let $V'=(V)^{N_A}$ mod p, where V is the query encrypted with Alice's key that is sent to Ted to be transformed to a query encrypted for B.

$$(V')^{R_{A,B}} = ((V)^{N_A})^{R_{A,B}} \bmod p$$
$$= (V)^{N_A \cdot R_{A,B}} \bmod p$$
$$= ((V)^{R_{A,B}})^{N_A} \bmod p$$
$$= (\{V\}_{K_B})^{N_A} \bmod p$$

This value can be decrypted using the decryption key corresponding to $N_A$, and $\{V\}_{K_B}$ can be used to generate a query to Bob as described earlier.

Figure 4:
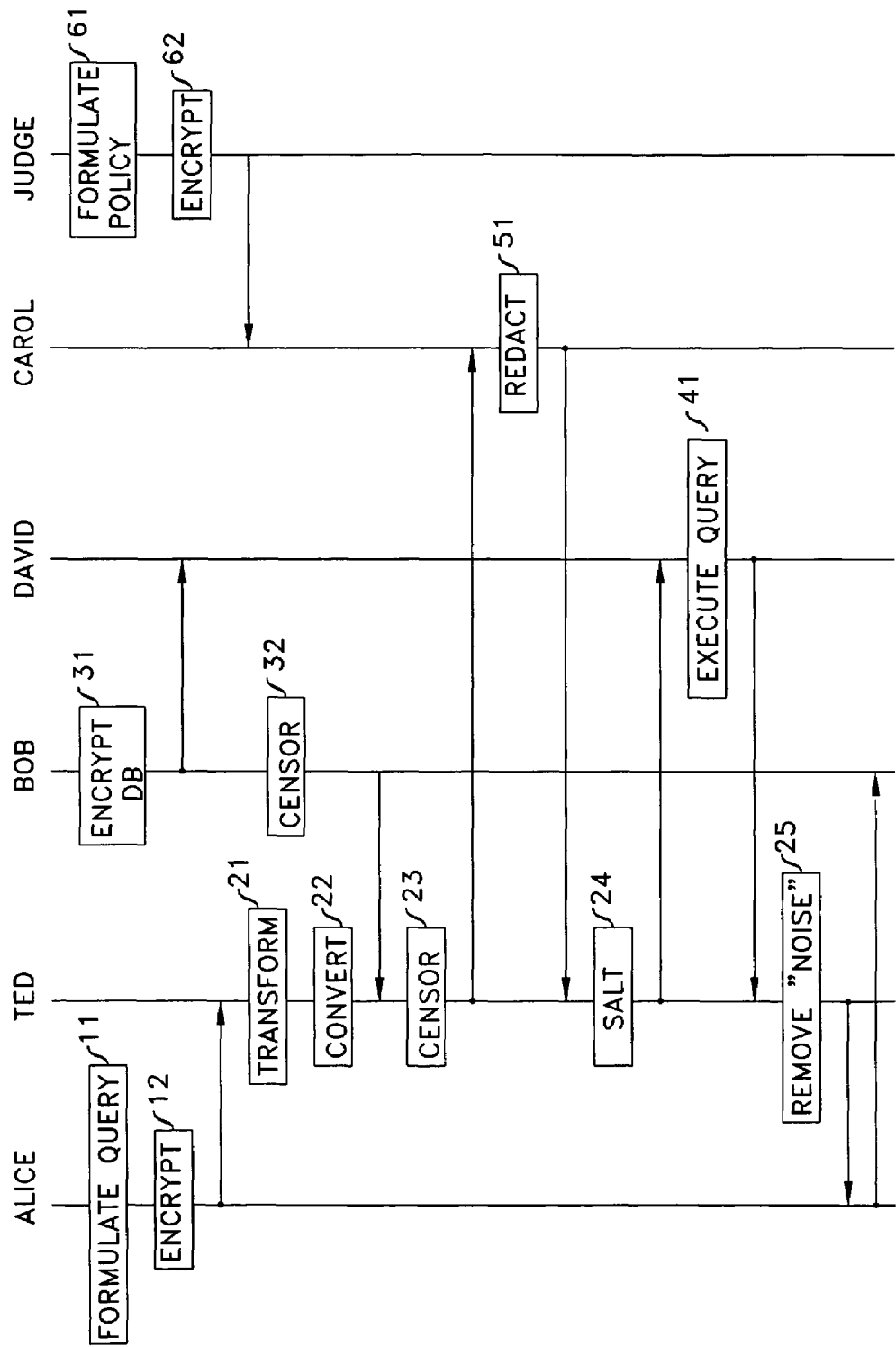
FIG. 4 shows the communication flow between the entities of FIG. 1.

FIG. 4 shows in an illustrative example the communication flow between the entities shown in FIG. 1. Alice formulates a query in step 11 and proceeds to PH encrypt it in step 12. She sends the encrypted message to Ted. Ted transform it to Carol's key in step 21, and converts it to set form in step 22, or hashes with function G it as discussed above to insure that Bob cannot decrypt it.

Some time prior thereto, Bob encrypted his database in step 31 (or hashes it with G, as discussed above), forwarded it to David, formulated the censorship that is to be applied to all queries from Alice in step 32, and forwarded the censorship information to Ted. Ted creates a modified query based on the censorship information in step 23, and forwards the modified query to Carol.

Some time prior thereto, in step 61 Judge determines the terms that are impermissible for Carol to search on, encrypted it with Carol's key in step 62, and forwarded it to Carol.

When Carol receives the query, it is processed according to the information provided to Carol by Judge to redact impermissible terms in step 51, and sends the results back to Ted. Ted salts the query with additional search terms in step 24, and forwards the resulting search set to David. When the query resulting from step 24 arrives, David executes the query in step 41 on the index provided by Bob, and sends the results to Ted.

In step 25 Ted removes the responses the resulted from the terms added by step 24, and sends the result to Alice. Lastly, Alice sends a message to Bob requesting the documents that she decides are of interest to her, based on the response to her query that she received from Ted's step 24.

The above discloses the principles of this invention, but it should be realized that various modifications and additions can be made without parting from the spirit and scope thereof. To illustrate, the above describes an arrangement where a query is presented to Carol and Carol executes a restriction on the query pursuant to specified criteria. The restricted, or redacted, query is forwarded to Ted, Ted performs some processing, and the results are sent to the querier (e.g., Alice). It is also possible to have Alice's query be sent to Carol (via Ted), and have the results sent to Alice via Carol. Carol can then process the results—rather than the query—and carry out the specified restrictions at that time. Such an approach can actually be advantageous in that Carol would receive results that not only indicate hits, but also the quality of the hits. Armed with this information Carol can determine the potential relevance of the retrieved documents. In a litigation setting, for example, Carol's directive might be to disallow retrieval of documents that that include the words "competition" and "price" (because they do not rise to the requisite level of materiality), but to allow retrieval of documents that include the words "competition," "price," and "beat" (because they are sufficiently material to the litigation). In other words, when Carol receives the raw query results, Carol can entertain directives that are responsive to soft notions such as "probably cause," or "sufficiently" relevant.

The invention claimed is:

1. A method for querying a database that is encrypted with key $k_A$, comprising the steps of:
    a mediator party receiving from a first party a database query that is encrypted with key $K_B$, and
    said mediator party transforming said database query encrypted with $k_B$ to a query encrypted with a key to form a transformed query, where $k_A$ is different from, $k_B$ and said mediator has neither $k_A$ nor $k_B$;
    said mediator party forwarding said transformed query to a warrant server;
    said mediator party receiving from said warrant server a query modified by said warrant server; and
    said mediator party transforming said query modified by said warrant server to a query encrypted with said key $k_A$, where said mediator does not have said key, said key $k_A$ or said key $k_B$.

2. The method of claim 1 where said key is said key $k_A$.

3. The method of claim 1 further comprising the step of said mediator party forwarding said transformed query to enable arrival of said transformed query at a second party having access to a searchable portion of said encrypted database.

4. The method of claim 3 further comprising said second party
    performing a search of said searchable portion of said encrypted database based on said query, to obtain results; and
    sending said results to said first party.

5. The method of claim 3 further comprising the steps of said second party searching said searchable portion of said encrypted database to obtain results, applying to said results an encryption key that is related to a target party, and forwarding the results to said warrant server.

6. The method of claim 1 where said query includes at least two query terms and a Boolean operator.

7. The method of claim 1 where said encrypted database comprises Bloom filter signatures, each of which consists of at most n elements.

8. The method of claim 1 where Pohlig-Hellman encryptions are used for the encryptions.

9. The method of claim 1 where database data encrypted with said key $k_A$ is said data raised to a power $k_A$ modulo a selected number p, where p is a prime number such that p=2p'+1, where p' is also a prime number, and where said database query encrypted with key $k_B$ is said database query raised to a power $k_B$ modulo p.

10. The method of claim 1 where said query encrypted with $k_A$ comprises at least one set of values.

11. The method of claim 1 where said query encrypted with $k_A$ comprises sets of values, and logical connectors.

12. The method of claim 1 where said step of transforming includes said mediator applying a censorship set to said database query.

13. The method of claim 12 where said censorship set is sensitive to identity of said first party.

14. The method of claim 1 where said step of transforming includes said mediator modifying said database query by salting said database query.

15. The method of claim 14 where said salting comprises adding one or more elements to said at least one set of values.

16. The method of claim 14 where said salting comprises adding one or more sets of values and logical OR connectors.

17. The method of claim 1 further comprising a step of said warrant server modifying the received transformed query by deleting query set elements.

18. The method of claim 17 where said warrant server modifies the received transformed query based on information provided by a fourth party.

19. The method of claim 18 where said information provided by said fourth party provides is encrypted with said key.

20. The method of claim 17 where said modifying is based on identity of said first party.

21. A method comprising:
    a first party sending to a mediator party a query encrypted with key of said first party, $k_1$;
    said mediator party salting said query;
    said mediator party converting said query to a query encrypted with a key of a warrant server, $k_2$;
    said warrant server applying censorship related to restrictions on search, and returning a restricted query to said mediator party;
    said mediator party applying to said restricted query a censorship related to identity of said first party, to form a final search query;
    said mediator party converting said final search query to a query encrypted with key of a third party, $k_2$, and forwarding the query encrypted with $k_2$ to said third party; and
    said third party executing a search and outputting search results.

22. The method of claim 21 where said search results are forwarded to said first party.

23. A method comprising:
    a first party sending to a mediator party a query encrypted with key of said first party, $k_1$;
    said mediator party salting said query, applying to the salted query a censorship that is related to identity of said first party, converting the censored query to a query encrypted with a key of a second party, $k_2$ to form a final search query, and forwarding the final search query to said second party;
    said second party executing a search based on said final search query, and outputting search results to said mediator party;
    said mediator party applying to said search results a key, $k_2$, of a warrant server, and forwarding said search results to said warrant server;

said warrant server applying censorship related to restrictions on search, and returning results of said censorship to said mediator party; and said mediator party converting information received from said warrant server to results information encrypted with said key $k_1$, and forwarding the information encrypted with said key $k_1$ to said first party.

24. A method for querying a database that is encrypted with key $k_1$ comprising the steps of:

a first party sending a database query that is encrypted with key $k_2$ to an mediator party, said mediator party transforming said database query encrypted with $k_2$ to a query encrypted with said key $k_1$ to form a transformed query, where keys $k_1$ nor $k_2$ belong to a given Abelian group; and said mediator forwarding said transformed query to enable arrival of said transformed query at a second party having access to a searchable portion of said encrypted database;

said mediator party forwarding said transformed query to a warrant server;

said mediator party receiving from said warrant server a query modified by said warrant server; and said mediator party transforming said query modified by said warrant server to a query encrypted with said key $k_1$, where said mediator does not have said key, said key $k_1$ or said key $k_2$.

25. A method for querying a database that is encrypted with key $k_1$ comprising the steps of:

a first party sending a database query that is encrypted with key $k_2$ to an mediator party, said mediator party transforming said database query encrypted with $k_2$ to a query encrypted with said key $k_1$ to form a transformed query, where keys $k_1$ nor $k_2$ are such that $\{\{X\}_{k1}\}_{k2} = \{X\}_{k2 * k1}$ for all $k_1$ and $k_2$, and some operator "$\circ$"; and said mediator forwarding said transformed query to enable arrival of said transformed query at a second party having access to a searchable portion of said encrypted database;

said mediator party forward said transformed query to a warrant server;

said mediator party receiving from said warrant server a query modified by said warrant server; and said mediator party transforming said query modified by said warrant server to a query encrypted with said key $k_1$ where said mediator does not have said key, said key $k_1$ or said key $k_2$.

26. The method of claim 25 where said encrypted database comprises Bloom filter signatures, each of which consists of at most n elements when expressed in set form.

27. The method of claim 25 where said encrypted database comprises an index of Bloom filter signature elements.

28. The method of claim 25 where said database is encrypted by use of the Pohlig-Hellman encryption algorithm.

29. The method of claim 1 where said database that is encrypted with key $k_4$ is encrypted by a party other than said first party or said mediator party.

30. The method of claim 1 where said database is under control of a party other than said mediator party.

* * * * *